United States Patent
Leonard

[15] 3,679,014
[45] July 25, 1972

[54] BALANCE

[72] Inventor: Edward H. Leonard, 184 Holden St., Holden, Mass.

[22] Filed: July 21, 1971

[21] Appl. No.: 164,714

[52] U.S. Cl. .............................................. 177/216, 177/236
[51] Int. Cl. ................... G01g 1/04, G01g 23/24, G01g 23/28
[58] Field of Search .............................. 177/203–206, 236, 177/216–219, 224

[56] References Cited

UNITED STATES PATENTS

| | | | |
|---|---|---|---|
| 1,974 | 2/1841 | Dampier | 177/203 |
| 530,980 | 12/1894 | Witzel | 177/216 |
| 608,518 | 8/1898 | Grimmel | 177/203 |
| 1,573,869 | 2/1926 | Sanders | 177/216 |

FOREIGN PATENTS OR APPLICATIONS

| | | | |
|---|---|---|---|
| 567,515 | 12/1923 | France | 177/224 |
| 737,859 | 10/1932 | France | 177/216 |

Primary Examiner—Robert S. Ward, Jr.
Attorney—Charles R. Fay

[57] ABSTRACT

A self-adjusting balance comprising a stirrup supporting a rotatable disk at its center. The front face of the disk is graduated in degrees from 0° to 90°, the graduations continuing on the reverse face from 90° to 0°. At the rim of the disk there are two slots, at diametrically opposite 0° marks, to accommodate cords, one to be connected to a weight to be measured and the other to a standard weight, the weight to be measured being connected to the cord in the front face 0° slot with the cord lying circumferentially against a portion of the rim of the disk to the point where this cord hangs free and vertical, the standard weight being connected to the cord in the diametrically opposite slot, this cord hanging free and vertical.

7 Claims, 3 Drawing Figures

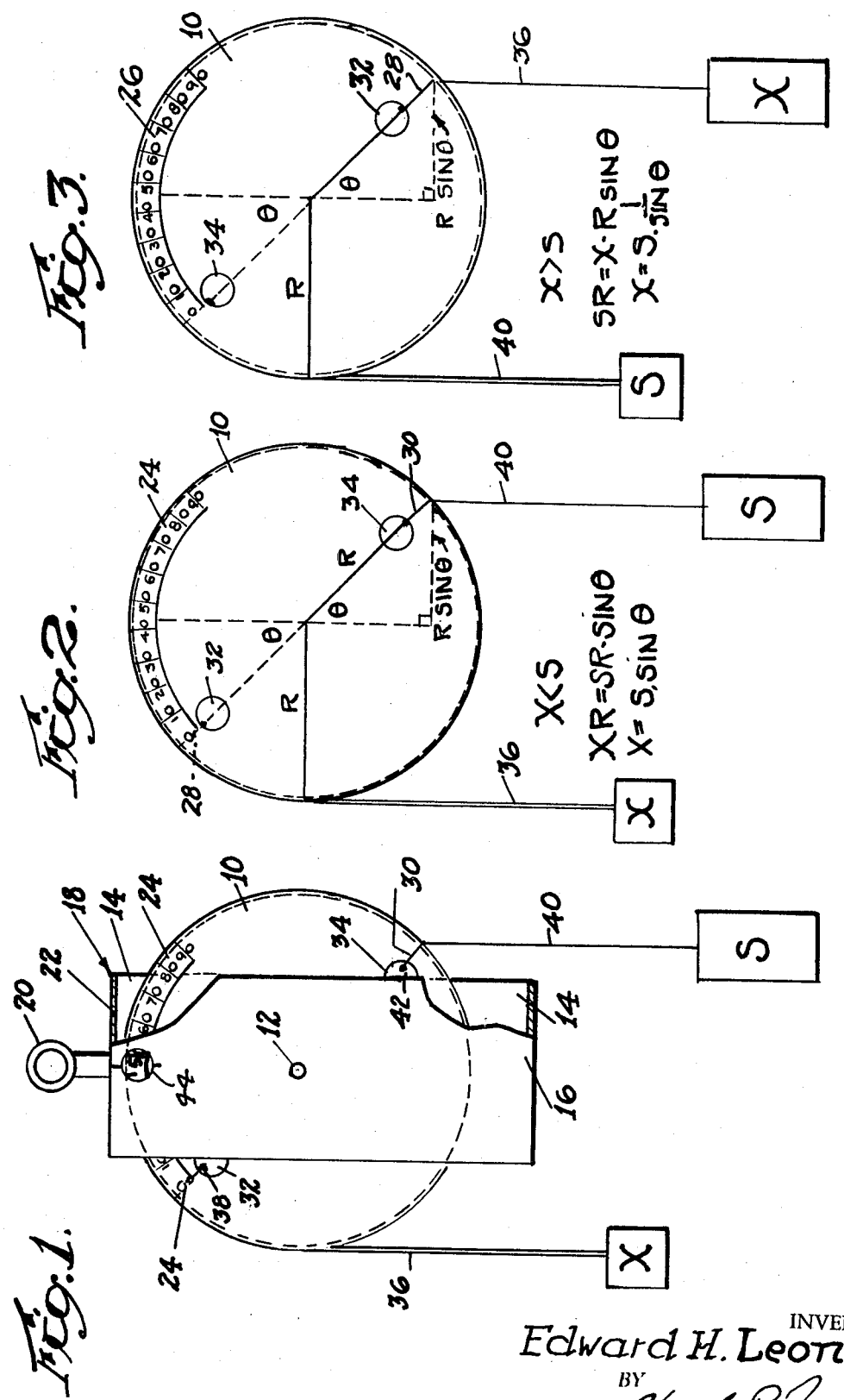

BALANCE

BACKGROUND OF THE INVENTION

The two inexpensive weighing devices in common use are the spring-type scale and the beam balance. The spring-type scale, although self-adjusting, is limited to a range determined by the stiffness of the spring. In order then to measure a wide range of weights one must either sacrifice sensitivity by using a relatively stiff spring or use several instruments with different spring stiffnesses.

The common inexpensive beam balance is not self-adjusting, requiring instead that the operator move a rider or riders in order to bring the beam to its balanced position, an operation which, particularly for an inexperienced operator, may take considerable time.

With the beam balance and usually with the spring-type scale (except where provided with English-metric equivalent units) calibrations which appear on these instruments allow one to weigh within only a single system of units, i.e., grams or ounces or pounds, etc.

SUMMARY OF THE INVENTION

The present invention is a device for weighing an object by balancing the torque produced by the object on a calibrated disk with the torque produced by a standard weight acting so as to produce counter-rotation on the same disk.

The magnitude of the weight to be measured is a function of the angle through which the disk rotates and the weight of the standard. Knowing the weight of the standard, the unknown weight can be determined by referring either to a sine table which may appear on the front face of a stirrup supporting the disk or to a table of reciprocal sines, which may appear on the reverse side of the support.

The proposed device consists of few and simple parts. It eliminates the limited range restriction inherent with the spring-type scale, for with the proposed device the value of any weight can be determined subject only to the physical strength of the instrument itself. The sensitivity of the measurement can be controlled by the choice of the counter-balancing standard weight used.

The proposed device is self-adjusting in that the effective moment arm is determined automatically as the disk rotates to assume a balanced position thus eliminating the necessity for the operator manually to slide a rider on a beam.

The proposed device may be used within any system of units (grams, ounces, pounds, etc.,) determined not by the characteristics of the device itself but by the unit associated with the standard weight employed.

BRIEF DESCRIPTION OF THE DRAWINGS

FIG. 1 is a view in front elevation illustrating the balance, part being broken away;

FIG. 2 is a view illustrating the front face of the disk and the determination of the value of $X$ where $X < S$; and FIG. 3 is a like view at the reverse face of the disk and determination of the value of $X$ where $X > S$.

PREFERRED EMBODIMENT OF THE INVENTION

The construction of the balance is shown in FIG. 1. A disk 10 having a center pin 12 is rotatably mounted thereon between the spaced legs 14 and 16 of a hanger 18 having a supporting ring 20 at the closed end thereof 22. This hanger may be open at the bottom or closed as shown in FIG. 1. A graduation 24 from 0° to 90° is placed as shown on one face of the disk and on the opposite face a graduation 26 continues from 90° to 0°. Thus 180° of the disk bears graduations.

At each 0° mark partial slots 28, 30 extend radially from the edge of the disk into through access holes 32, 34 respectively. A cord 36 with an end knot 38 is mounted in slot 28 and draped on the periphery of the disk. A like cord 40 with knot 42 is mounted in slot 30, and standard weight S is secured thereto. The cord 36 is to support unknown weight $X$. The hanger may be clear, or a sight hole 44 can be used to read the graduations at the top of the disk after rotation of the disk to balance under the influence of the weights.

Referring to FIG. 2, with the parts in balanced position, $XR = SR \cdot \sin \Theta$ or, $X = S \cdot \sin \Theta$ where
$X$ = weight of object ($X < S$)
$S$ = weight of standard
$R$ = radius of disk
$\theta$ = angle through which disk rotates If the weight of object $X$ is less than the weight of the standard (as is the case in FIG. 2) the rotation of the disk will be through an angle less than 90° in which case the value of the weight of the object will be equal to the value of $S$ times the sine of the angle through which the disk has rotated. On the front face of the hanger may be printed a table of angles and their sines in terms of which the weight of the object can readily be determined.

If the weight of object $X$ is greater than the weight of standard $S$ (see FIG. 3) the rotation of the disk will be through an angle greater than 90°. In this case the scale indicating angle of rotation appears on the opposite face of the disk. Here (FIG. 3) $SR = XR \cdot \sin \Theta$ or, $X = S \cdot (1)(\sin \Theta)$ where
$X$ = weight of object ($X > S$)
$S$ = weight of standard
$r$ = radius of disk
$\Theta = 180° -$ (angle through which disk rotates)

On the corresponding face of the hanger may be printed a table of angles and the reciprocals of their sines in terms of which the value of $X$ can readily be determined.

It will be noted that with the table of sines and the table of reciprocal sines appearing on opposite faces of hanger corresponding to the scales which appear on opposite faces of the disk, it would be difficult for anyone to use the improper table in making a calculation.

I claim:

1. A balance comprising a vertical disk, means mounting the disk centrally thereof for free rotation, graduations in degrees at one face of the disk, a first cord attached to the disk at its periphery in a predetermined relation to the graduations, a second cord attached to the disk at its periphery diametrically opposite the point of attachment of the first cord to the disk,
a known weight attached to one cord,
an unknown weight attached to the other cord,
one cord hang free and vertical and the other cord being draped on the disk at the periphery thereof, wherein
the locations of the graduations to the points of attachment of the cords to the disk ensuring that some area of the graduations will appear at the top of the disk, and the said points of attachment will be spaced from the top of the disk.

2. The balance of claim 1 wherein said graduations appear partly on one face of the disk and partly on the opposite face.

3. The balance of claim 2 wherein the graduations at one face of the disk are from 0° to 90°.

4. The balance of claim 3 wherein the graduations at the opposite face of the disk are from 90° to 0°.

5. The balance of claim 4 wherein the graduations are continuous for 180° of the disk.

6. The balance of claim 5 wherein the sequence of the graduations is 0° to 90° to 0°.

7. The balance of claim 6 including radial slots at the 0° marks, at 180° apart, the cords lying partially in the slots which form means for attaching the cords to the disk.

* * * * *